United States Patent
Chen

(10) Patent No.: US 8,251,289 B2
(45) Date of Patent: Aug. 28, 2012

(54) DATA PROTECTING ELECTRONIC DEVICE

(75) Inventor: Yu-Tsung Chen, Taipei County (TW)

(73) Assignee: Uniform Industrial Corp., Taipei County (TW)

( * ) Notice: Subject to any disclaimer, the term of this patent is extended or adjusted under 35 U.S.C. 154(b) by 81 days.

(21) Appl. No.: 13/019,623

(22) Filed: Feb. 2, 2011

(65) Prior Publication Data

US 2012/0126004 A1 May 24, 2012

(30) Foreign Application Priority Data

Nov. 24, 2010 (TW) .............................. 99140541 A

(51) Int. Cl.
*G06K 7/00* (2006.01)
(52) U.S. Cl. ....................................... 235/435; 235/441
(58) Field of Classification Search .................. 235/435, 235/436, 439, 441
See application file for complete search history.

(56) References Cited

U.S. PATENT DOCUMENTS

| | | | | |
|---|---|---|---|---|
| 5,726,432 | A * | 3/1998 | Reichardt | 235/441 |
| 6,896,778 | B2 * | 5/2005 | Lauks | 204/400 |
| 7,703,676 | B2 * | 4/2010 | Hart et al. | 235/449 |
| 7,824,529 | B2 * | 11/2010 | Lauks | 204/400 |

* cited by examiner

*Primary Examiner* — Daniel StCyr
(74) *Attorney, Agent, or Firm* — Muncy, Geissler, Olds & Lowe, PLLC

(57) ABSTRACT

A data protecting electronic device is adapted to read and store information, and includes: a circuit board; a first loop circuit, having a first contact and a second contact, constituting a wire mesh, and positioned on the circuit board; a substrate, configured on the circuit board; a data reading element, electrically connected to the first loop circuit, and one end thereof being passed through the circuit board to position on the substrate; a cover, covering the circuit board; a flexible circuit board, stuck to inner faces of the cover, and including a second loop circuit having a third contact and constituting the wire mesh; an electrical conductor, having a first end connected to the second contact and a second end connected to the third contact; and a conducting element, electrically connected to the first contact and covered by the cover.

8 Claims, 4 Drawing Sheets

DATA PROTECTING ELECTRONIC DEVICE

CROSS-REFERENCES TO RELATED APPLICATIONS

This non-provisional application claims priority under 35 U.S.C. §119(a) on Patent Application No. 99140541 filed in Taiwan, R.O.C. on 2010 Nov. 24, the entire contents of which are hereby incorporated by reference.

BACKGROUND OF THE INVENTION

1. Technical Field

The present invention relates to an electronic device, and more particularly to an electronic device in which data can be protected.

2. Related Art

Accompanying the rapid evolution of information technology, smart cards are used widely in daily life; the average person has a variety of smart cards, such as an ATM chip card, credit card, identification entrance card, VIP card and identification card, generally used on many levels such as banking, traffic, communication, guard, identification and medication; a user can have a variety of services depending on the type of a smart card.

However, the security problems facing personal credit information have gradually become increasingly serious since smart cards are frequently used in daily life in a broad range of situations, the most commonly seen of which is theft of a credit card's data card in order to fabricate a forged credit card illegally.

SUMMARY

To prevent credit information from being stolen, and prevent financial loss resulting, and to maintain financial order, the present invention is proposed. The present invention proposes a data protecting electronic device, adapted to read and store information, including: a circuit board, having a first face and a second face; a first loop circuit, having a first contact positioned on the first face and a second contact positioned on the second face, constituting a wire mesh and positioned on the circuit board; a substrate, configured on the second face; a signal reading element, electrically connected to the first loop circuit, and one end thereof being passed through the circuit board and positioned on the substrate; a cover, covering the circuit board and the substrate; a flexible circuit board, stuck on inner faces of the cover, having a third contact and a second loop circuit constituting a wire mesh; an electrical conductor, electrically connected to the first loop circuit and the second loop circuit, and having a first end connected to the second contact to conduct the first loop circuit and a second end opposite to the first end and connected to the third contact to conduct the second loop circuit; and a conducting element, electrically connected to the first contact to conduct the first loop circuit and covered by the cover; wherein the signal reading element is caused to break and the stored information is deliberately erased while one of the first loop circuit and the second loop circuit is opened or broken.

The electronic device of the present invention may be a card reader capable of reading various bar code, magnetic strip or chip type ATM cards, credit cards or electronic personal identification cards. The electronic device triggers and drives the first loop circuit or the second loop circuit to be opened or break automatically when it is damaged by an improper external force and the information stored therein is intended to be read, allowing the electronic device to clear the information stored therein, protecting instantly and thereby guarding against the divulgence of the information to avoid illegal forgery and even loss caused by embezzlement.

Furthermore, the aforementioned electronic device has a microprocessor and a data storing unit, which are adapted to execute functions such as card signal reading, data operation and data storing; they may be configured on the circuit board, substrate, or signal reading element. In addition, the circuit board, substrate, signal reading element, first loop circuit and second loop circuit of the electronic device form a three-dimensional protecting net, providing substantial protection for a data working process, preventing data from being read or divulged in the whole process beginning from the data reading, including the data operation, and ending at the data storing, even if it is damaged by an external force.

BRIEF DESCRIPTION OF THE DRAWINGS

The present invention can be more fully understood by reference to the following description and accompanying drawings, in which.

DETAILED DESCRIPTION

Figure 1:
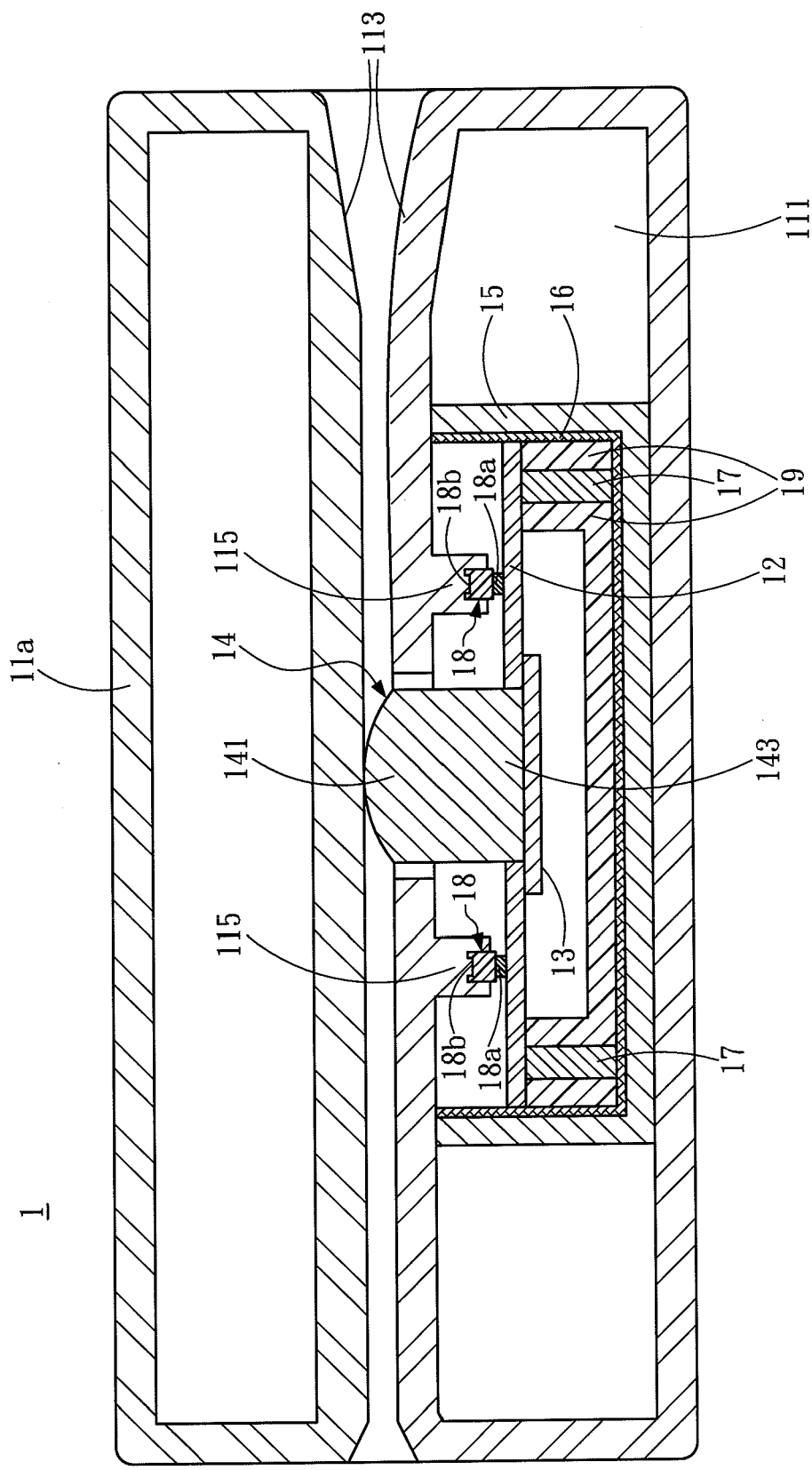
FIG. 1 is a cross sectional view, showing an electronic device of a first preferred embodiment according to the present invention.
Figure 2A:
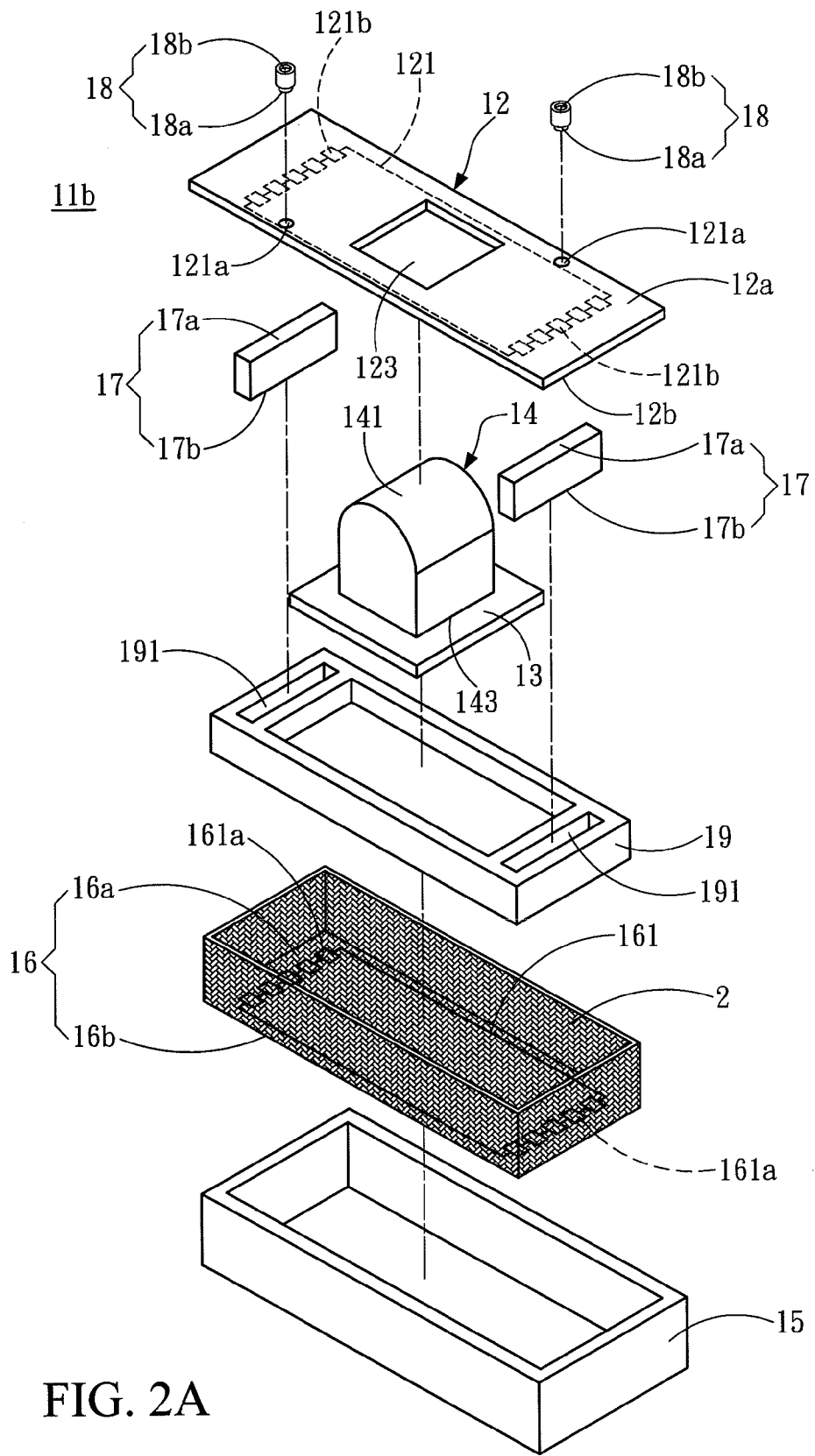
FIG. 2A is an exploded view, showing an electronic module of the first embodiment according to the present invention.
Figure 2B:
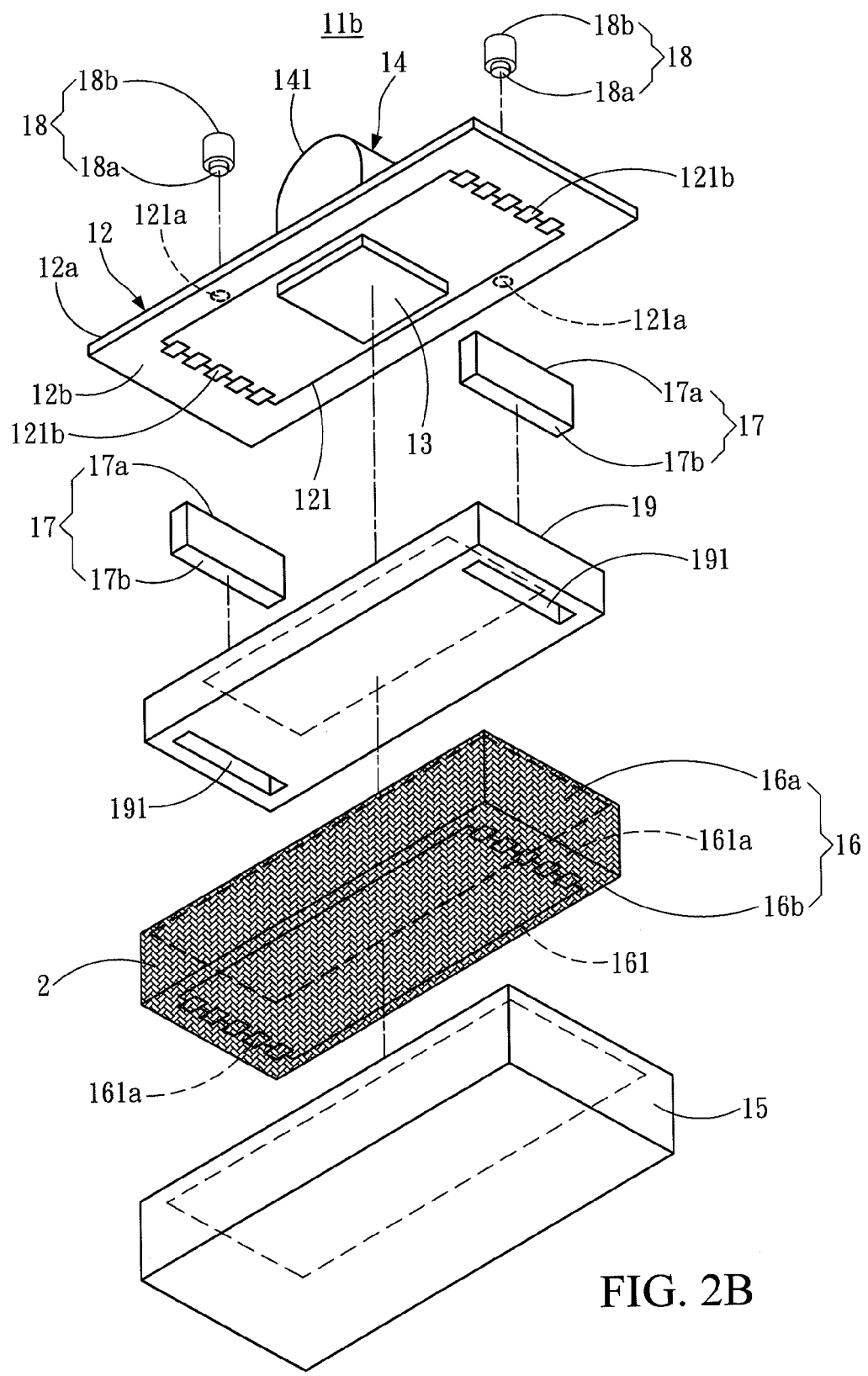
FIG. 2B is an exploded view in another angle of view, showing an electronic module of the first embodiment according to the present invention.

Please refer to FIGS. 1, 2A and 2B, in which a data protecting electronic device 1 of a first preferred embodiment according to the present invention is adapted to read and store information, and mainly constituting a housing 11a and an electronic module 11b, where the electronic module 11b includes a circuit board 12, substrate 13, signal reading element 14, cover 15, flexible circuit board 16, electrical conductor 17, and conducting element 18.

The housing 11a is made from plastics or other materials, and has an acceptor 111 and a card reading slot 113, where the electronic module 11b is positioned on the acceptor 111.

The circuit board 12 includes a first face 12a and a second face 12b. A first loop circuit 121 constituting a wire mesh 2 is configured on the outer surfaces (the first face 12a and the second face 12b) or inner layers of the circuit board 12.

The first loop circuit 121 may be positioned on the outer surfaces or the inner layers of the circuit board 12, and has a first contact 121a positioned on the first face 12a and a second contact 121b positioned on the second face 12b. The number of the first contact 121a and the number of the second contact 121b may be one or more than one, but the present invention is not limited to this number.

The substrate 13 is assembled on the inner side of the second face 12b of the circuit board 12, and may be consist of metal or other materials.

The signal reading element 14 is electrically connected to the first loop circuit 121 and adapted to read and store information; it has a first end 141 and a second end 143 opposite to each other. The first end 141 is exposed on the card reading slot 113 of the housing 11a, and the second end 143 is passed through a positioning hole 123 of the circuit board 12 to assemble and position on the substrate 13. The area of the substrate 13 is smaller than the circuit board 12 and larger than the positioning hole 123 such that the signal reading element 14 is not easy for a hacker to pull it out from the first face 12a of the circuit board 12. When the substrate 13, circuit board 12 or signal reading element 14 is damaged and separated from its original position, the information stored in the electronic device 1 will lose automatically, and the signal reading element 14 will lose the capability of reading signals.

The cover 15 covers the circuit board 12 and the substrate 13 from the places close to the sides of the second face 12b of the circuit board 12. The preferred structure of the cover 12 is rectangular or square five-faces cover, and the preferred material thereof is metal, but the present invention is not limited to these.

The flexible circuit board 16 is stuck to the inner face of the cover 15 completely, and includes a second loop circuit 161 having a third contact 161a. The second loop circuit 161 consists of a wire mesh 2. The number of the third contact 161a may be one or more than one, but the present invention is not limited to this number. In addition, the flexible circuit board 16 has a top face 16a and a bottom face 16b opposite to each other, where the third contact 161a is positioned on the top face 16a, and the bottom face 16b is stuck to the inner faces of the cover 15.

The electrical conductor 17 is electrically connected to the first loop circuit 121 and the second loop circuit 161, is a conductive material and has a first end 17a and a second end 17b opposite to each other, where the first end 17a is connected to the second contact 121b, and drives the first loop circuit 121 and the second loop circuit 161 in a conducting state when the second end 17b is connected to the third contact 161a The conducting element 18 has a bottom portion 18a and a top portion 18b opposite to each other, and is covered inside the cover 15, where the bottom portion 18a is electrically connected to the first contact 121a, and the top portion 18b includes an insulator. The first loop circuit 121 will be conducted when the conducting element 18 is electrically connected to the first contact 121a. In addition, the electrical conductor 17 and the conducting element 18 preferably include conducting rubber respectively.

Furthermore, the housing 11a further has a first connecting portion 115 adapted to position the conducting element 18, where the top portion 18b of the conducting element 18 is retained in the first connecting portion 115. The insulator mentioned above is adapted to electrically isolate the conducting element 18 from the housing 11a or the signal reading element 14.

Thereupon, the signal reading element 14 is caused to break and the information stored in the signal reading element 14 is deliberately erased every time when one of the first loop circuit 121 and the second loop circuit 161 is opened or broken.

In a preferred example of the present embodiment, the electronic module 11b further has a bracket 19 adapted to prop the flexible circuit board 16 against the inner faces of the cover 15, where the bracket 19 has a positioning hole 191 adapted to position the electrical conductor 17 on the bracket 19.

Figure 3:
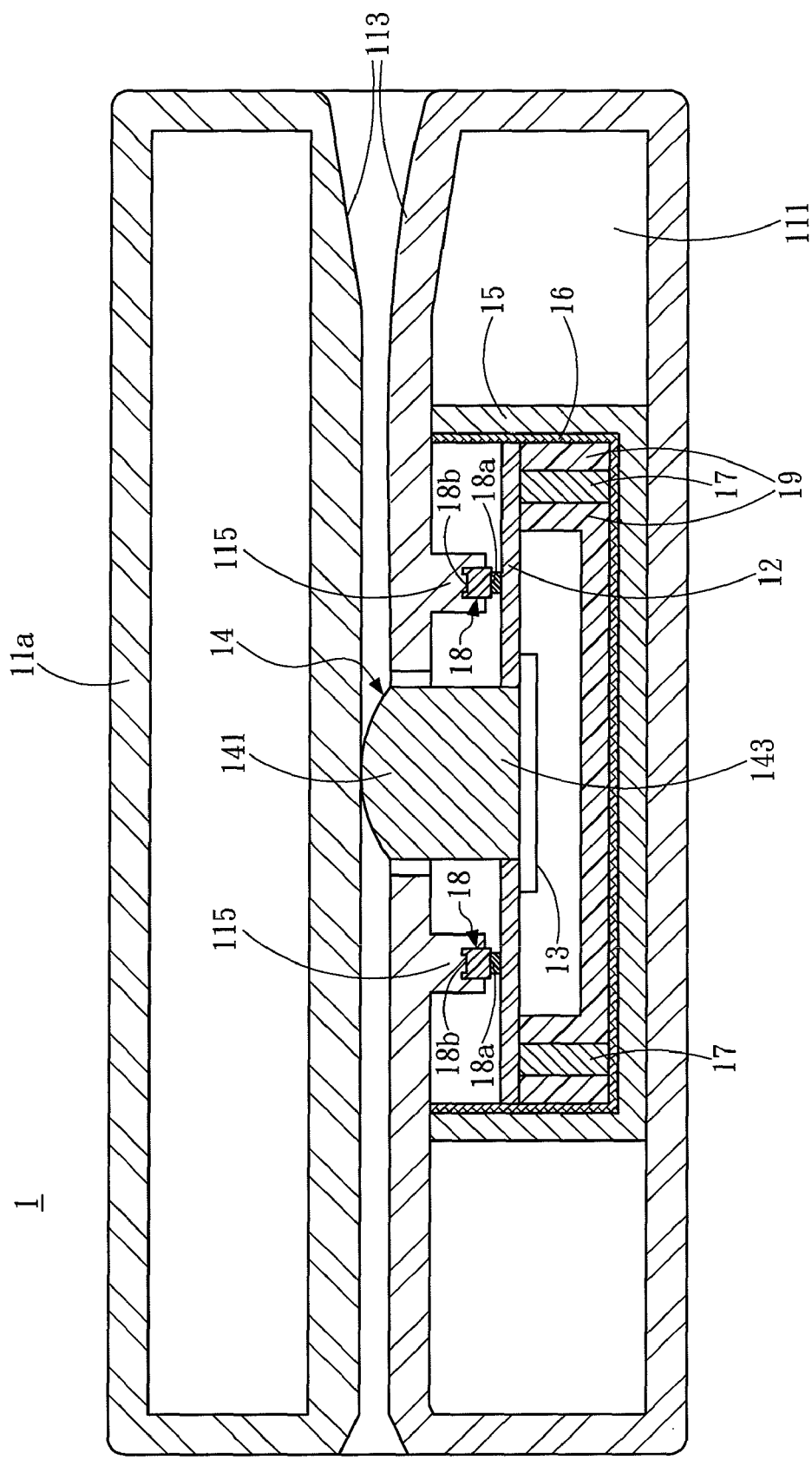
FIG. 3 is a cross sectional view, showing an electronic device of a second preferred embodiment according to the present invention.

Please refer to FIG. 3, in which a data protecting electronic device 1 of a second preferred embodiment according to the present invention preferably is one of a variety of data reading device, adapted to read the information of a bar code, magnetic strip or chip type starting media, which is a smart card such as ATM card, credit card, electronic personal identification card or the like.

The electronic device 1 of the present embodiment is similar to the one of the first embodiment, except the signal reading element 14 may have a microprocessing element (not shown in the figure), a data storing element (not shown in the figure), and a signal reading loop circuit (not shown in the figure). Moreover, the microprocessing element and data storing element mentioned above may also be configured on the second face 12b of the circuit board 12.

Because the first end 141 of the signal reading element 14 is exposed on the card reading slot 113 of the housing 11a, the signal reading loop circuit of the signal reading element 14 will read the information of a starting media, and store the read information in the data storing element configured on the signal reading element 14 or the circuit board 12 when the reading media is inserted in the card reading slot 113.

When the electronic device 1 is detached and damaged, it will cause the first loop circuit 121 and the second loop circuit 161 to be opened or broken, drive the signal reading element 14 to break, and then cause the information stored in the data storing element to be lost such that the information stored in the data storing element cannot be read. Moreover, the first loop circuit 121 will be caused to open or break, if the signal reading element 14 and the substrate 13 are pulled out forcibly causing the circuit board 12 to be damaged.

Furthermore, the electronic device 1 of the present invention may have a third loop circuit (not shown in the figure), constituting a signal circuit (not shown in the figure), where the third loop circuit is electrically connected to the first loop circuit 121. The first loop circuit 121 and the third loop circuit 131 will be caused to open or break when the signal reading element 14 is separated from the substrate 13.

Furthermore, the electronic device 1 of the present invention may have other constituting units, such as operating button (not shown in the figure), screen (not shown in the figure), network connection module (not shown in the figure), and the like, but the present invention is not limited to these.

The present invention protects the information stored in the electronic element by the following means according to the description mentioned above:

1. causing the electrical conductor to be separated from the second contact or the third contact, thereby causing the first loop circuit and the second loop circuit to be opened (disconnected) or broken when the cover is detached or damaged to separate from the circuit board;
2. causing the conducting element to be separated from the first contact thereby opening (disconnected) or breaking the first loop circuit if the housing is detached or damaged;
3. damaging the wire mesh of the flexible circuit board to cause the second loop circuit to be broken when the housing is worn, torn and penetrated because the flexible circuit board is stuck to the inner face of the cover;
4. causing the signal reading element to be separated from the circuit board thereby opening or breaking the first loop circuit when the signal reading element is pulled and torn by an external force because the signal reading element is electrically connected to the first loop circuit.
5. stopping the substrate by the circuit board, allowing the signal reading element not to be separated from its original position easily when the signal reading element is pulled and torn by an external force, or damaging the circuit board to break the first loop circuit if the signal reading element and the substrate are pulled out forcibly, because the signal reading element is positioned on the substrate; and 6. driving the first loop circuit to be opened or break with the second loop circuit when the signal reading element is separated from the substrate, if the substrate includes the third loop circuit constituting the signal circuit.

The opening or breaking of one of the first, second and third loop circuits causes the signal reading element to be broken, and drives the data storing element to clear the information stored thereby to prevent the information stored in the electronic device from being read, thereby avoiding the loss caused by embezzlement of the information.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A data protecting electronic device, adapted to read and store information, comprising:
    a circuit board, comprising a first face and a second face;
    a first loop circuit, constituting a wire mesh, and positioned on the circuit board, comprising:
        a first contact, positioned on the first face; and
        a second contact, positioned on the second face;
    a substrate, configured on the second face;
    a signal reading element, electrically connected to the first loop circuit, and one end thereof being passed through the circuit board to position on the substrate;
    a cover, covering the circuit board and the substrate;
    a flexible circuit board, stuck to an inner face of the cover, comprising a second loop circuit having a third contact, and the second loop circuit constituting the wire mesh;
    an electrical conductor, electrically connected to the first loop circuit and the second loop circuit, and comprising:
        a first end, connected to the second contact to conduct the first loop circuit; and
        a second end, opposite to the first end, and connected to the third contact to conduct the second loop circuit; and
    a conducting element, electrically connected to the first contact to conduct the first loop circuit and covered by the cover;
    wherein the signal reading element is caused to break and the information is deliberately erased when one of the first loop circuit and the second loop circuit is opened or broken.

2. The data protecting electronic device according to claim 1, further comprising a bracket, adapted to prop the flexible circuit board against inner faces of the cover, and to position the electrical conductor.

3. The data protecting electronic device according to claim 1, wherein the flexible circuit board comprises a top face and a bottom face opposite to each other, the third contact is positioned on the top face, and the bottom face is stuck tightly to the inner faces of the cover.

4. The data protecting electronic device according to claim 1, wherein the conducting element comprises:
    a bottom portion, electrically connected to the first contact; and
    a top portion, opposite to the bottom portion and comprises an insulator.

5. The data protecting electronic device according to claim 1, wherein the electrical conductor drives the first loop circuit to be opened with the second loop circuit while being separated form the second contact or the third contact.

6. The data protecting electronic device according to claim 1, wherein the first loop circuit is caused to open when the conducting element is separated from the first contact.

7. The data protecting electronic device according to claim 1, wherein the first loop circuit is caused to break when the signal reading element and the substrate is pulled out forcibly causing the circuit board to be damaged.

8. The data protecting electronic device according to claim 1, wherein the substrate comprises a third loop circuit constituting a signal circuit, the third loop circuit is electrically connected to the first loop circuit, and the first loop circuit and the third loop circuit are caused to be opened or break when the signal reading element is separated from the substrate.

* * * * *